United States Patent
Ha et al.

(10) Patent No.: US 7,042,954 B2
(45) Date of Patent: May 9, 2006

(54) APPARATUS AND METHOD FOR CALCULATING SOFT DECISION VALUE INPUT TO CHANNEL DECODER IN A DATA COMMUNICATION SYSTEM

(75) Inventors: Sang-Hyuck Ha, Suwon-shi (KR); Min-Goo Kim, Suwon-shi (KR)

(73) Assignee: Samsung Electronics Co., Ltd., (KR)

( * ) Notice: Subject to any disclaimer, the term of this patent is extended or adjusted under 35 U.S.C. 154(b) by 758 days.

(21) Appl. No.: 10/244,598

(22) Filed: Sep. 17, 2002

(65) Prior Publication Data
US 2003/0138054 A1  Jul. 24, 2003

(30) Foreign Application Priority Data
Sep. 18, 2001  (KR) .............................. 2001-57622

(51) Int. Cl.
*H04L 5/12* (2006.01)
*H04L 23/02* (2006.01)
(52) U.S. Cl. ............. 375/261; 375/262; 375/342; 329/304
(58) Field of Classification Search ........... 375/261, 375/219, 262, 295, 341, 324, 340, 280, 332, 375/285, 326, 346, 147, 130, 232; 370/334, 370/335, 286; 455/137; 714/794, 795, 796
See application file for complete search history.

(56) References Cited

U.S. PATENT DOCUMENTS

| | | | |
|---|---|---|---|
| 6,302,576 B1 * | 10/2001 | Ono et al. ................. | 714/794 |
| 6,430,214 B1 * | 8/2002 | Jalloul et al. ............... | 375/147 |
| 6,452,983 B1 * | 9/2002 | Asahara et al. ............. | 375/324 |
| 6,466,558 B1 * | 10/2002 | Ling ......................... | 370/334 |
| 6,594,318 B1 * | 7/2003 | Sindhushayana ............ | 375/262 |
| 6,661,282 B1 * | 12/2003 | Ha et al. .................... | 329/304 |
| 6,834,088 B1 * | 12/2004 | Agami et al. ............... | 375/324 |
| 6,904,097 B1 * | 6/2005 | Agami et al. ............... | 375/261 |
| 2001/0043650 A1 * | 11/2001 | Sommer et al. ............ | 375/232 |
| 2002/0131515 A1 * | 9/2002 | Rodriguez .................. | 375/262 |
| 2003/0112900 A1 * | 6/2003 | Ha et al. .................... | 375/332 |

* cited by examiner

*Primary Examiner*—Temesghen Ghebretinsae
*Assistant Examiner*—J. Meek
(74) *Attorney, Agent, or Firm*—Roylance, Abrams, Berdo & Goodman, LLP

(57) ABSTRACT

A 64-ary QAM (Quadrature Amplitude Modulation) demodulation apparatus and method for receiving an input signal $R_k(X_k,Y_k)$ comprised of a $k^{th}$ quadrature-phase signal $Y_k$ and a $k^{th}$ in-phase signal $X_k$, and generating soft decision values $\Lambda(s_{k,5})$, $\Lambda(s_{k,4})$, $\Lambda(s_{k,3})$, $\Lambda(s_{k,2})$, $\Lambda(s_{k,1})$ and $\Lambda(s_{k,0})$ for the input signal $R_k(X_k,Y_k)$ are disclosed. A first soft decision value generator receives the quadrature-phase signal $Y_k$ of the received signal $R_k$ and a distance value 2a between six demodulated symbols on the same axis, and generates soft decision values $\Lambda(s_{k,5})$, $\Lambda(s_{k,4})$ and $\Lambda(s_{k,3})$ for sixth, fifth, and fourth demodulated symbols. A second soft decision value generator receives the in-phase signal $X_k$ of the received signal $R_k$ and the distance value 2a between the six demodulated symbols on the same axis, and generates soft decision values $\Lambda(s_{k,2})$, $\Lambda(s_{k,1})$ and $\Lambda(s_{k,0})$ for third, second and first demodulated symbol.

6 Claims, 6 Drawing Sheets

APPARATUS AND METHOD FOR CALCULATING SOFT DECISION VALUE INPUT TO CHANNEL DECODER IN A DATA COMMUNICATION SYSTEM

PRIORITY

This application claims priority to an application entitled "Apparatus and Method for Calculating Soft Decision Value Input to Channel Decoder in a Data Communication System" filed in the Korean Industrial Property Office on Sep. 18, 2001 and assigned Serial No. 2001-57622, the entire contents of which are incorporated herein by reference.

BACKGROUND OF THE INVENTION

1. Field of the Invention

The present invention relates generally to a demodulation apparatus and method for a data communication system employing multi-level modulation, and in particular, to an apparatus and method for calculating an input value to a channel decoder in a demodulator for a data communication system employing 64-ary QAM (Quadrature Amplitude Modulation).

2. Description of the Related Art

In general, a data communication system employs multi-level modulation in order to increase spectral efficiency. The multi-level modulation includes various modulation techniques. Herein, reference will be made to 64-ary QAM, one of the multi-level modulation techniques. As known by those skilled in the art, a 64-ary QAM channel encoder modulates a signal coded by binary encoding and transmits the coded signal to a receiver. The receiver then receives the transmitted modulated signal and decodes the modulated signal through soft decision values decoding in a channel decoder. To perform the decoding, a demodulator of the receiver includes a mapping algorithm for generating soft decision values (or soft values), because the received modulated signal is comprised of an in-phase signal component and a quadrature-phase signal component. Therefore, the demodulator of the receiver includes a mapping algorithm for generating soft decision values each corresponding to output bits of the channel encoder from a 2-dimensional received signal.

The mapping algorithm is classified into a simple metric procedure proposed by Nokia, and a dual minimum metric procedure proposed by Motorola. Both algorithms calculate LLR (Log Likelihood Ratio) values for the output bits and use the calculated LLR values as input soft decision values to the channel decoder. The simple metric procedure, which employs a mapping algorithm given by modifying a complex LLR calculation formula into a simple approximate formula, has a simple LLR calculation formula. However, LLR distortion caused by the use of the approximate formula leads to performance degradation. The dual minimum metric procedure, which employs a mapping algorithm of calculating LLR with a more accurate approximate formula and uses the calculated LLR as an input soft decision value of the channel decoder, can make up for performance degradation of the simple metric procedure to some extent. However, compared with the simple metric procedure, this procedure needs increased calculations, thus causing a considerable increase in hardware complexity.

SUMMARY OF THE INVENTION

It is, therefore, an object of the present invention to provide an apparatus and method for obtaining a soft decision value without performing complex calculations in a demodulator for a data communication system employing 64-ary QAM.

It is another object of the present invention to provide an apparatus and method for designing demodulator with a simple circuit to obtain a soft decision value for a data communication system employing 64-ary QAM.

It is yet another object of the present invention to provide an apparatus and method for obtaining a correct soft decision value with a simple circuit in a demodulator for a data communication system employing 64-ary QAM.

To achieve the above and other objects, an embodiment of the present invention provides a 64-ary QAM (Quadrature Amplitude Modulation) demodulation apparatus for receiving an input signal $R_k(X_k, Y_k)$ comprised of a $k^{th}$ quadrature-phase signal $Y_k$ and a $k^{th}$ in-phase signal $X_k$, and for generating soft decision values $\Lambda(s_{k,5})$, $\Lambda(s_{k,4})$, $\Lambda(s_{k,3})$, $\Lambda(s_{k,2})$, $\Lambda(s_{k,1})$ and $\Lambda(s_{k,0})$ for the input signal $R_k(X_k, Y_k)$ by a soft decision techniques. The apparatus comprises a first soft decision value generator that receives the quadrature-phase signal $Y_k$ of the received signal $R_k$ and a distance value 2a between six demodulated symbols on the same axis, and generates soft decision values $\Lambda(s_{k,5})$, $\Lambda(s_{k,4})$ and $\Lambda(s_{k,3})$ for sixth, fifth and fourth demodulated symbols using the following equations.

$$Z_{1k} = |Y_k| - 4a$$

$$Z_{2k} = |Z_{1k}| - 2a$$

$$\Lambda(s_{k,5}) = Y_k + c(\alpha \cdot Z_{1k} + \beta \cdot Z_{2k}), \text{ where}$$

$$\alpha = \begin{cases} 3 & \text{if } MSB(Z_{1k}) = 0 \\ 0 & \text{if } MSB(Z_{1k}) = 1 \end{cases}$$

$$\beta = \begin{cases} 0 & \text{if } MSB(Z_{2k}) = 0 \\ -1 & \text{if } MSB(Z_{2k}) = 1 \end{cases} \text{ and}$$

$$c = \begin{cases} 1 & \text{if } MSB(Y_k) = 0 \\ -1 & \text{if } MSB(Y_k) = 1 \end{cases}$$

$$\Lambda(s_{k,4}) = Z_{1k} + \gamma \cdot Z_{2k}, \text{ where}$$

$$\gamma = \begin{cases} 0 & \text{if } MSB(Z_{2k}) = 1 \\ 1 & \text{if } MSB(Z_{2k}) = 0 \text{ and } MSB(Z_{1k}) = 0 \\ -1 & \text{if } MSB(Z_{2k}) = 0 \text{ and } MSB(Z_{1k}) = 1 \end{cases}$$

$$\Lambda(s_{k,3}) = Z_{2k}$$

where $\Lambda(s_{k,5})$ indicates the soft decision value for the sixth modulated symbol, $\Lambda(s_{k,4})$ indicates the soft decision value for the fifth modulated symbol, and $\Lambda(s_{k,3})$ indicates the soft decision value for the fourth modulated symbol. A second soft decision value generator receives the in-phase signal $X_k$ of the received signal $R_k$ and the distance value 2a between the six demodulated symbols on the same axis, and generates soft decision values $\Lambda(s_{k,2})$, $\Lambda(s_{k,1})$ and $\Lambda(s_{k,0})$ for third, second and first demodulated symbols using the following equations.

$$Z'_{1k} = |X_k| - 4a$$

$$Z'_{2k} = |Z'_{1k}| - 2a$$

$$\Lambda(s_{k,2}) = X_k + c'(\alpha' \cdot Z'_{1k} + \beta' \cdot Z'_{2k}), \text{ where}$$

$$\alpha' = \begin{cases} 3 & \text{if } MSB(Z'_{1k}) = 0 \\ 0 & \text{if } MSB(Z'_{1k}) = 1 \end{cases}$$

$$\beta' = \begin{cases} 0 & \text{if } MSB(Z'_{2k}) = 0 \\ -1 & \text{if } MSB(Z'_{2k}) = 1 \end{cases} \text{ and}$$

$$c' = \begin{cases} 1 & \text{if } MSB(X_k) = 0 \\ -1 & \text{if } MSB(X_k) = 1 \end{cases}$$

$$\Lambda(s_{k,1}) = Z'_{1k} + \gamma' \cdot Z'_{2k}, \text{ where}$$

$$\gamma' = \begin{cases} 0 & \text{if } MSB(Z'_{2k}) = 1 \\ 1 & \text{if } MSB(Z'_{2k}) = 0 \text{ and } MSB(Z'_{1k}) = 0 \\ -1 & \text{if } MSB(Z'_{2k}) = 0 \text{ and } MSB(Z'_{1k}) = 1 \end{cases}$$

$$\Lambda(s_{k,0}) = Z'_{2k}$$

where $\Lambda(s_{k,2})$ indicates the soft decision value for the third modulated symbol, $\Lambda(s_{k,1})$ indicates the soft decision value for the second modulated symbol, and $\Lambda(s_{k,0})$ indicates the soft decision value for the first modulated symbol and the "MSB" means the most significant bit and the "a" means a distance value on the same axis.

The first soft decision value generator comprises a first operator for calculating $Z_{1k}=|Y_k|-4a$ by receiving the quadrature-phase signal $Y_k$ and the distance value between the demodulated symbols on the same axis, and a second operator for calculating $Z_{2k}=|Z_{1k}|-2a$ by receiving the output value $Z_{1k}$ of the first operator, and providing the calculated value $Z_{2k}$ as the soft decision value $\Lambda(s_{k,3})$ for the fourth demodulated symbol. The first soft decision value generator further comprises a first MSB (Most Significant Bit) calculator for calculating MSB of the quadrature-phase signal $Y_k$, a second MSB calculator for calculating MSB of the output value $Z_{1k}$ of the first operator, and a third MSB calculator for calculating MSB of the output value $Z_{2k}$ of the second operator. The first soft decision value generator also comprises a first selector for selecting the output value $Z_{1k}$ of the first operator or a value "0" according to an output value of the second MSB calculator, a second selector for selecting an inversed value $-Z_{2k}$ of the output value $Z_{2k}$ of the second operator or a value "0" according to an output value of the third MSB calculator, a first adder for adding an output value of the second selector to a value determined by multiplying the output value of the first selector by 3, a third selector for selecting an output value of the first adder or an inversed value of the output value of the first adder according to an output value of the first MSB calculator. In addition, the first soft decision value generator comprises a second adder for adding an output value of the third selector to the quadrature-phase signal $Y_k$ and generating the added signal as the soft decision value $\Lambda(s_{k,5})$ for the sixth demodulated symbol, a fourth selector for selecting the output value $Z_{2k}$ of the second operator or an inversed value $-Z_{2k}$ of the output value $Z_{2k}$ according to the output value of the second MSB calculator, a fifth selector for selecting an output value of the fourth selector or a value "0" according to the output value of the third MSB calculator, and a third adder for adding an output value of the fifth selector to the output value $Z_{1k}$ of the first operator and generating the added value as the soft decision value $\Lambda(s_{k,4})$ for the fifth demodulated symbol.

The second soft decision value generator comprises a third operator for calculating $Z'_{1k}=|X_k|-4a$ by receiving the in-phase signal $X_k$ and the distance value between the demodulated symbols on the same axis, and a fourth operator for calculating $Z'_{2k}=|Z'_{1k}|-2a$ by receiving the output value $Z'_{1k}$ of the third operator, and providing the calculated value $Z'_{2k}$ as the soft decision value $\Lambda(s_{k,0})$ for the first demodulated symbol. The second soft decision value generator also comprises a fourth MSB calculator for calculating MSB of the in-phase signal $X_k$, a fifth MSB calculator for calculating MSB of the output value $Z'_{1k}$ of the third operator, and a sixth MSB calculator for calculating MSB of the output value $Z'_{2k}$ of the fourth operator. The second soft decision value generator further comprises a sixth selector for selecting the output value $Z'_{1k}$ of the third operator or a value "0" according to an output value of the fifth MSB calculator, a seventh selector for selecting an inversed value $-Z'_{2k}$ of the output value $Z'_{2k}$ of the fourth operator or a value "0" according to an output value of the sixth MSB calculator, a fourth adder for adding an output value of the seventh selector to a value determined by multiplying the output value of the sixth selector by 3, and an eighth selector for selecting an output value of the fourth adder or an inversed value of the output value of the fourth adder according to an output value of the fourth MSB calculator. In addition, the second soft decision value generator comprises a fifth adder for adding an output value of the eighth selector to the in-phase signal $X_k$ and generating the added signal as the soft decision value $\Lambda(s_{k,2})$ for the third demodulated symbol, a ninth selector for selecting the output value $Z'_{2k}$ of the fourth operator or an inversed value $-Z'_{2k}$ of the output value $Z'_{2k}$ according to the output value of the fifth MSB calculator, a tenth selector for selecting an output value of the ninth selector or a value "0" according to the output value of the sixth MSB calculator, and a sixth adder for adding an output value of the tenth selector to the output value $Z'_{1k}$ of the third operator and generating the added value as the soft decision value $\Lambda(s_{k,1})$ for the second demodulated symbol.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

An embodiment of the present invention will be described below with reference to the accompanying drawings. In the following description, well-known functions or constructions are not described in detail.

An embodiment of the present invention provides an apparatus and method for obtaining a soft decision value input to a channel decoder, calculated by the dual minimum metric procedure, without a mapping table or complex calculations in a demodulator for a data communication system employing 64-ary QAM.

An algorithm for generating multi-dimensional soft decision values from a 2-dimentional received signal will be described below. An output sequence of a binary channel encoder is divided into m bits, and mapped to corresponding signal points among M ($=2^m$) signal points according to a Gray coding rule. This can be represented by $$s_{k,m-1}s_{k,m-2} \cdots s_{k,0} \xrightarrow{f} I_k, Q_k \quad \text{Equation (1)}$$

Figure 1:
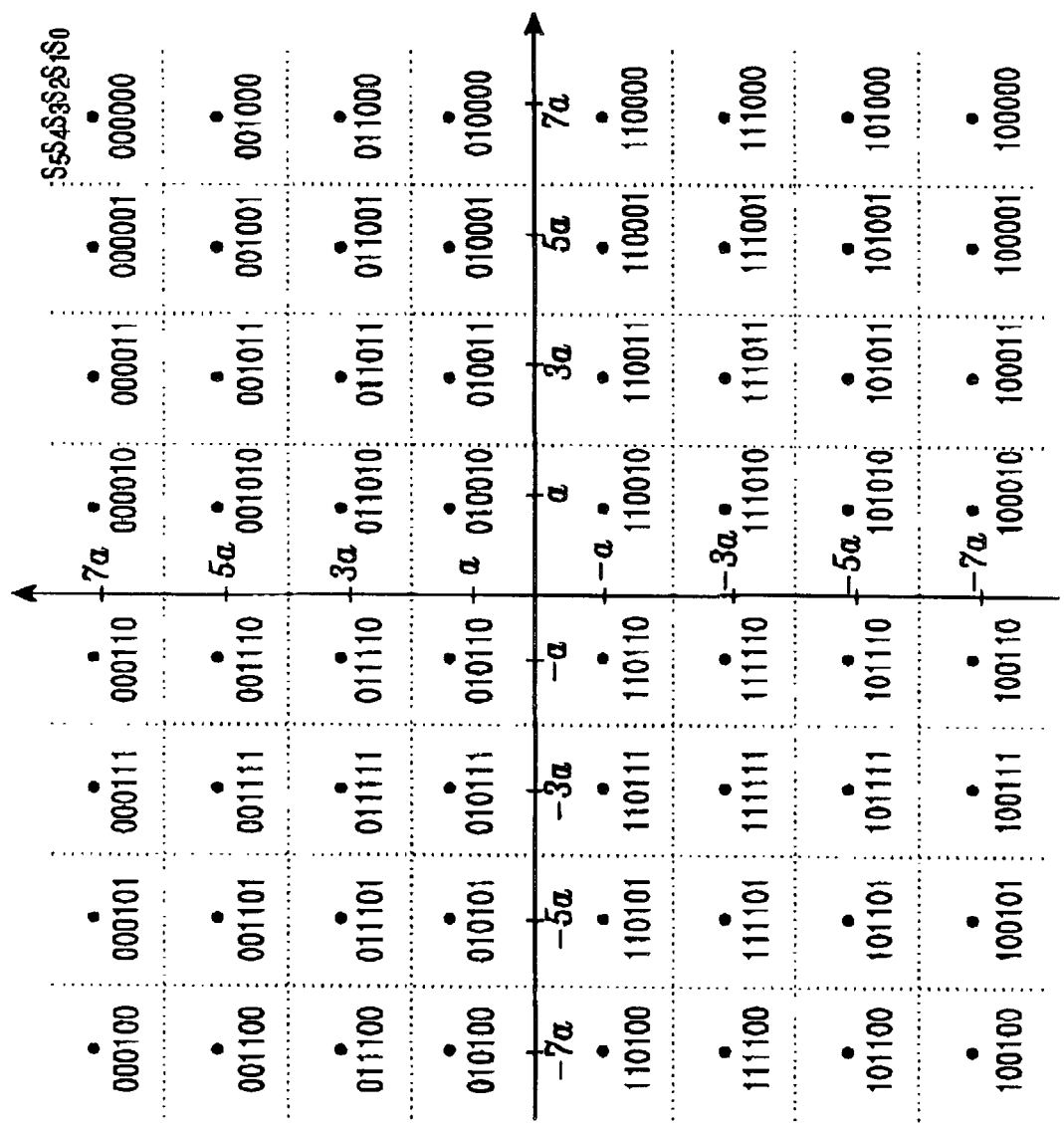
FIG. 1 illustrates an example of a signal constellation for 64-ary QAM (Quadrature Amplitude Modulation)

In Equation (1), $s_{k,i}$ (i=0,1, ..., m-1) indicates an $i^{th}$ bit in the output sequence of the binary channel encoder, mapped to a $k^{th}$ symbol, and $I_k$ and $Q_k$ indicate an in-phase signal component and a quadrature-phase signal component of the $k^{th}$ symbol, respectively. For 64-ary QAM, m=6 and a corresponding signal constellation is illustrated in FIG. 1.

A complex output of a symbol demodulator in the receiver, comprised of $I_k$ and $Q_k$, is defined as $$R_k = X_k + jY_k = g_k(I_k + jQ_k) + (\eta_k^I + j\eta_k^Q) \quad \text{Equation (2)}$$

In Equation (2), $X_k$ and $Y_k$ indicate an in-phase signal component and a quadrature-phase signal component of the output of the symbol demodulator, respectively. Further, $g_k$ is a complex coefficient indicating gains of the transmitter, the transmission media and the receiver. In addition, $\eta_k^I$ and $\eta_k^Q$ are Gaussian noises with an average 0 and a divergence $\sigma_n^2$, and they are statistically independent of each other.

LLR related to the sequence $s_{k,i}$ (i=0,1, ..., m-1) can be calculated by Equation (3), and the calculated LLR can be used as a soft decision value input to the channel decoder.

$$\Lambda(s_{k,i}) = K \log \frac{\Pr\{s_{k,i} = 0 \mid X_k, Y_k\}}{\Pr\{s_{k,i} = 1 \mid X_k, Y_k\}} \quad \text{Equation (3)}$$

$$i = 0, 1, \ldots, m-1$$

In Equation (3), k is a constant, and $\Pr\{A|B\}$ indicates a conditional probability defined as a probability that an event A will occur when an event B occurs. However, since Equation (3) is non-linear and accompanies relatively many calculations, an algorithm capable of approximating Equation (3) is required for actual realization. In the case of a Gaussian noise channel with $g_k=1$ in Equation (2), Equation (3) can be approximated by the dual minimum metric procedure as follows.

$$\Lambda(s_{k,i}) = K \log \frac{\sum_{z_k} \exp\{-1/\sigma_\eta^2 |R_k - z_k(s_{k,i}=0)|^2\}}{\sum_{z_k} \exp\{-1/\sigma_\eta^2 |R_k - z_k(s_{k,i}=1)|^2\}} \quad \text{Equation (4)}$$

$$\approx K \log \frac{\exp\{-1/\sigma_\eta^2 \min|R_k - z_k(s_{k,i}=0)|^2\}}{\exp\{-1/\sigma_\eta^2 \min|R_k - z_k(s_{k,i}=1)|^2\}}$$

$$= K'[\min|R_k - z_k(s_{k,i}=1)|^2 -$$

$$\min|R_k - z_k(s_{k,i}=0)|^2]$$

In Equation (4), $K'=(1/\sigma_n^2)K$, and $z_k(s_{k,i}=0)$ and $z_k(s_{k,i}=1)$ indicate actual values of $I_k+jQ_k$ for $s_{k,i}=0$ and $s_{k,i}=1$, respectively. In order to calculate Equation (4), it is necessary to determine $z_k(s_{k,i}=0)$ and $z_k(s_{k,i}=1)$ minimizing $|R^k-z_k(s_{k,i}=0)|^2$ and $|R_k-z_k(s_{k,i}=1)|^2$, for a 2-dimensional received signal $R_k$. Equation (4) approximated by the dual minimum metric procedure can be rewritten as $$\Lambda(s_{k,i}) = K'[\min|R_k - z_k(s_{k,i}=1)|^2 - \quad \text{Equation (5)}$$

$$\min|R_k - z_k(s_{k,i}=0)|^2]$$

$$= K'(2n_{k,i} - 1)[|R_k - z_k(s_{k,i}=n_{k,i})|^2 -$$

$$\min|R_k - z_k(s_{k,i}=\bar{n}_{k,i})|^2]$$

In Equation (5), $n_{k,i}$ indicates an $i^{th}$ bit value of a reverse mapping sequence for a signal point nearest to $R_k$, and $\bar{n}_{k,i}$ indicates a negation for $n_{k,i}$. The nearest signal point is determined by ranges of an in-phase signal component and a quadrature-phase signal component of $R_k$. A first term in the brackets of Equation (5) can be rewritten as $$|R_k - z_k(s_{k,i}=n_{k,i})|^2 = (X_k - U_k)^2 + (Y_k - V_k)^2 \quad \text{Equation (6)}$$

In Equation (6), $U_k$ and $V_k$ denote an in-phase signal component and a quadrature-phase signal component of a nearest signal point mapped by $\{n_{k,m-1}, \ldots, n_{k,i}, \ldots, n_{k,1}, n_{k,0}\}$, respectively. Further, a second term in the brackets of Equation (5) can be written as $$\min|R_k - z_k(s_{k,i}=\bar{n}_{k,i})|^2 = (X_k - U_{k,i})^2 + (Y_k - V_{k,i})^2 \quad \text{Equation (7)}$$

In Equation (7), $U_{k,i}$ and $V_{k,i}$ denote an in-phase signal component and a quadrature-phase signal component of a signal point mapped by a reverse mapping sequence $\{m_{k,m-1}, \ldots, m_{k,i}(=\bar{n}_{k,i}), \ldots, m_{k,1}, m_{k,0}\}$ of $z_k$ minimizing $|R_k-z_k(s_{k,i}=\bar{n}_{k,i})|^2$, respectively. Equation (5) is rewritten as Equation (8) by Equation (6) and Equation (7).

$$\Lambda(s_{k,i}) = K'(2n_{k,i} - 1)[\{(X_k - U_k)^2 + (Y_k - V_k)^2\} - \quad \text{Equation (8)}$$

$$\{(X_k - U_{k,i})^2 + (Y_k - V_{k,i})^2\}]$$

$$= K'(2n_{k,i} - 1)[(U_k + U_{k,i} - 2X_k)(U_k - U_{k,i}) +$$

$$(V_k + V_{k,i} - 2Y_k)(V_k - V_{k,i})]$$

A process of calculating input soft decision values to the channel decoder by a demodulator in accordance with Equation (8) in a data communication system employing 64-ary QAM will be described below. First, Table 1 and Table 2 are used to calculate $\{n_{k,5}, n_{k,4}, n_{k,3}, n_{k,2}, n_{k,1}, n_{k,0}\}$, $U_k$ and $V_k$ from two signal components $X_k$ and $Y_k$ of a 64-ary QAM-modulated received signal $R_k$.

TABLE 1

| Condition of $Y_k$ | ($n_{k,5}$, $n_{k,4}$, $n_{k,3}$) | $V_k$ |
|---|---|---|
| $Y_k > 6a$ | (0, 0, 0) | $7a$ |
| $4a < Y_k < 6a$ | (0, 0, 1) | $5a$ |
| $2a < Y_k < 4a$ | (0, 1, 1) | $3a$ |
| $0 < Y_k < 2a$ | (0, 1, 0) | $a$ |
| $-2a < Y_k < 0$ | (1, 1, 0) | $-a$ |
| $-4a < Y_k < -2a$ | (1, 1, 1) | $-3a$ |
| $-6a < Y_k < -4a$ | (1, 0, 1) | $-5a$ |
| $Y_k < -6a$ | (1, 0, 0) | $-7a$ |

TABLE 2

| Condition of $X_k$ | $(n_{k,2}, n_{k,1}, n_{k,0})$ | $U_k$ |
|---|---|---|
| $X_k > 6a$ | (0, 0, 0) | $7a$ |
| $4a < X_k < 6a$ | (0, 0, 1) | $5a$ |
| $2a < X_k < 4a$ | (0, 1, 1) | $3a$ |
| $0 < X_k < 2a$ | (0, 1, 0) | $a$ |
| $-2a < X_k < 0$ | (1, 1, 0) | $-a$ |
| $-4a < X_k < -2a$ | (1, 1, 1) | $-3a$ |
| $-6a < X_k < -4a$ | (1, 0, 1) | $-5a$ |
| $X_k < -6a$ | (1, 0, 0) | $-7a$ |

Table 1 illustrates $(n_{k,5}, n_{k,4}, n_{k,3})$ and $V_k$ for the case where a quadrature-phase signal component $Y_k$ of the received signal $R_k$ appears in each of 8 regions parallel to a horizontal axis in FIG. 1. For the sake of convenience, 7 boundary values, that is, result values at $Y_k=-6a$, $Y_k=-4a$, $Y_k=-2a$, $Y_k=0$, $Y_k=2a$, $Y_k=4a$ and $Y_k=6a$, are omitted from Table 1. Where "a" means a distance value on the same axis and the "a" indicating a distance value, can have a different value according to a modulating/demodulating method. Table 2 illustrates $(n_{k,2}, n_{k,1}, n_{k,0})$ and $U_k$ for the case where an in-phase signal component $X_k$ of the received signal $R_k$ appears in each of 8 regions parallel to a vertical axis in FIG. 1. For the sake of convenience, 7 boundary values, that is, result values at $X_k=-6a$, $X_k=-4a$, $X_k=-2a$, $X_k=0$, $X_k=2a$, $X_k=4a$ and $X_k=6a$, are omitted from Table 2.

Table 3 illustrates a sequence $\{m_{k,5}, m_{k,4}, m_{k,3}, m_{k,2}, m_{k,1}, m_{k,0}\}$ minimizing $|R_k - z_k(s_{k,i} = \bar{n}_{k,i})|^2$, calculated for i (where i $\in \{0, 1, 2, 3, 4, 5\}$), in terms of a function $\{n_{k,5}, n_{k,4}, n_{k,3}, n_{k,2}, n_{k,1}, n_{k,0}\}$, and also illustrates in-phase and quadrature-phase signal components $U_{k,i}$ and $V_{k,i}$ of the corresponding $z_k$.

TABLE 3

| i | $\{m_{k,5}, m_{k,4}, m_{k,3}, m_{k,2}, m_{k,1}, m_{k,0}\}$ | $V_{k,i}$ | $U_{k,i}$ |
|---|---|---|---|
| 5 | $\{\bar{n}_{k,5}, 1, 0, n_{k,2}, n_{k,1}, n_{k,0}\}$ | $V_{k,5}$ | $U_k$ |
| 4 | $\{n_{k,5}, \bar{n}_{k,4}, 1, n_{k,2}, n_{k,1}, n_{k,0}\}$ | $V_{k,4}$ | $U_k$ |
| 3 | $\{n_{k,5}, n_{k,4}, \bar{n}_{k,3}, n_{k,2}, n_{k,1}, n_{k,0}\}$ | $V_{k,3}$ | $U_k$ |
| 2 | $\{n_{k,5}, n_{k,4}, n_{k,3}, \bar{n}_{k,2}, 1, 0\}$ | $V_k$ | $U_{k,2}$ |
| 1 | $\{n_{k,5}, n_{k,4}, n_{k,3}, n_{k,2}, \bar{n}_{k,1}, 1\}$ | $V_k$ | $U_{k,1}$ |
| 0 | $\{n_{k,5}, n_{k,4}, n_{k,3}, n_{k,2}, n_{k,1}, \bar{n}_{k,0}\}$ | $V_k$ | $U_{k,0}$ |

Table 4 and Table 5 illustrate $V_{k,i}$ and $U_{k,i}$ corresponding to $(m_{k,5}, m_{k,4}, m_{k,3})$ and $(m_{k,2}, m_{k,1}, m_{k,0})$ calculated in Table 3, for all combinations of $(n_{k,5}, n_{k,4}, n_{k,3})$ and $(n_{k,2}, n_{k,1}, n_{k,0})$, respectively.

TABLE 4

| $(n_{k,5}, n_{k,4}, n_{k,3})$ | $V_{k,5}$ | $V_{k,4}$ | $V_{k,3}$ |
|---|---|---|---|
| (0, 0, 0) | $-a$ | $3a$ | $5a$ |
| (0, 0, 1) | $-a$ | $3a$ | $7a$ |
| (0, 1, 1) | $-a$ | $5a$ | $a$ |
| (0, 1, 0) | $-a$ | $5a$ | $3a$ |
| (1, 1, 0) | $a$ | $-5a$ | $-3a$ |
| (1, 1, 1) | $a$ | $-5a$ | $-a$ |
| (1, 0, 1) | $a$ | $-3a$ | $-7a$ |
| (1, 0, 0) | $a$ | $-3a$ | $-5a$ |

TABLE 5

| $(n_{k,2}, n_{k,1}, n_{k,0})$ | $U_{k,2}$ | $U_{k,1}$ | $U_{k,0}$ |
|---|---|---|---|
| (0, 0, 0) | $-a$ | $3a$ | $5a$ |
| (0, 0, 1) | $-a$ | $3a$ | $7a$ |
| (0, 1, 1) | $-a$ | $5a$ | $a$ |
| (0, 1, 0) | $-a$ | $5a$ | $3a$ |

TABLE 5-continued

| $(n_{k,2}, n_{k,1}, n_{k,0})$ | $U_{k,2}$ | $U_{k,1}$ | $U_{k,0}$ |
|---|---|---|---|
| (1, 1, 0) | $a$ | $-5a$ | $-3a$ |
| (1, 1, 1) | $a$ | $-5a$ | $-a$ |
| (1, 0, 1) | $a$ | $-3a$ | $-7a$ |
| (1, 0, 0) | $a$ | $-3a$ | $-5a$ |

Table 6 and Table 7 illustrate results given by down-scaling, in a ratio of K'×4a, input soft decision values of the channel decoder obtained by substituting $V_{k,1}$ and $U_{k,i}$ of Table 4 and Table 5 into Equation (8).

TABLE 6

| Condition of $Y_k$ | $\Lambda(s_{k,5})$ | $\Lambda(s_{k,4})$ | $\Lambda(s_{k,3})$ |
|---|---|---|---|
| $Y_k > 6a$ | $4Y_k - 12a$ | $2Y_k - 10a$ | $Y_k - 6a$ |
| $4a < Y_k < 6a$ | $3Y_k - 6a$ | $Y_k - 4a$ | $Y_k - 6a$ |
| $2a < Y_k < 4a$ | $2Y_k - 2a$ | $Y_k - 4a$ | $-Y_k + 2a$ |
| $0 < Y_k < 2a$ | $Y_k$ | $2Y_k - 6a$ | $-Y_k + 2a$ |
| $-2a < Y_k < 0$ | $Y_k$ | $-2Y_k - 6a$ | $Y_k + 2a$ |
| $-4a < Y_k < -2a$ | $2Y_k + 2a$ | $-Y_k - 4a$ | $Y_k + 2a$ |
| $-6a < Y_k < -4a$ | $3Y_k + 6a$ | $-Y_k - 4a$ | $-Y_k - 6a$ |
| $Y_k < -6a$ | $4Y_k + 12a$ | $-2Y_k - 10a$ | $-Y_k - 6a$ |

TABLE 7

| Condition of $X_k$ | $\Lambda(s_{k,2})$ | $\Lambda(s_{k,1})$ | $\Lambda(s_{k,0})$ |
|---|---|---|---|
| $X_k > 6a$ | $4X_k - 12a$ | $2X_k - 10a$ | $X_k - 6a$ |
| $4a < X_k < 6a$ | $3X_k - 6a$ | $X_k - 4a$ | $X_k - 6a$ |
| $2a < X_k < 4a$ | $2X_k - 2a$ | $X_k - 4a$ | $-X_k + 2a$ |
| $0 < X_k < 2a$ | $X_k$ | $2X_k - 6a$ | $-X_k + 2a$ |
| $-2a < X_k < 0$ | $X_k$ | $-2X_k - 6a$ | $X_k + 2a$ |
| $-4a < X_k < -2a$ | $2X_k + 2a$ | $-X_k - 4a$ | $X_k + 2a$ |
| $-6a < X_k < -4a$ | $3X_k + 6a$ | $-X_k - 4a$ | $-X_k - 6a$ |
| $X_k < -6a$ | $4X_k + 12a$ | $-2X_k - 10a$ | $-X_k - 6a$ |

That is, when a received signal $R_k$ is applied, LLR satisfying a corresponding condition can be output as an input soft decision value by Table 6 and Table 7. If the channel decoder used in the system is not a max-logMAP (logarithmic maximum a posteriori) decoder, a process of up-scaling the LLR of Table 6 and Table 7 in a reverse ratio of the down-scale ratio must be added.

However, when outputting an input soft decision value of the channel decoder using the mapping table of Table 6 or Table 7, the demodulator should perform an operation of deciding a condition of the received signal and require a memory for storing the output contents according to the corresponding condition. This can be avoided by calculating the input soft decision values to the channel decoder using a formula having a simple condition decision operation instead of the mapping table.

To this end, the condition decision formulas shown in Table 6 and Table 7 can be expressed as shown in Table 8 and Table 9.

TABLE 8

| Condition of $Y_k$ | Sign of $Y_k$ | Sign of $Z_{1k}$ | Sign of $Z_{2k}$ | $Z_{1k}$ | $Z_{2k}$ |
|---|---|---|---|---|---|
| $Y_k > 6a$ | $Y_k \geq 0$ | $Z_{1k} \geq 0$ | $Z_{2k} \geq 0$ | $Y_k - 4a$ | $Y_k - 6a$ |
| $4a < Y_k < 6a$ | | | $Z_{2k} < 0$ | $Y_k - 4a$ | $Y_k - 6a$ |
| $2a < Y_k < 4a$ | | $Z_{1k} < 0$ | $Z_{2k} < 0$ | $Y_k - 4a$ | $-Y_k + 2a$ |
| $0 < Y_k < 2a$ | | | $Z_{2k} \geq 0$ | $Y_k - 4a$ | $-Y_k + 2a$ |
| $-2a < Y_k < 0$ | $Y_k < 0$ | $Z_{1k} < 0$ | $Z_{2k} \geq 0$ | $-Y_k - 4a$ | $Y_k + 2a$ |
| $-4a < Y_k < -2a$ | | | $Z_{2k} < 0$ | $-Y_k - 4a$ | $Y_k + 2a$ |
| $-6a < Y_k < -4a$ | | $Z_{1k} \geq 0$ | $Z_{2k} < 0$ | $-Y_k - 4a$ | $-Y_k - 6a$ |
| $Y_k < -6a$ | | | $Z_{2k} \geq 0$ | $-Y_k - 4a$ | $-Y_k - 6a$ |

TABLE 9

| Condition of $X_k$ | Sign of $X_k$ | Sign of $Z'_{1k}$ | Sign of $Z'_{2k}$ | $Z'_{1k}$ | $Z'_{2k}$ |
|---|---|---|---|---|---|
| $X_k > 6a$ | $X_k \geq 0$ | $Z'_{1k} \geq 0$ | $Z'_{2k} \geq 0$ | $X_k - 4a$ | $X_k - 6a$ |
| $4a < X_k < 6a$ | | | $Z'_{2k} < 0$ | $X_k - 4a$ | $X_k - 6a$ |
| $2a < X_k < 4a$ | | $Z'_{1k} < 0$ | $Z'_{2k} < 0$ | $X_k - 4a$ | $-X_k + 2a$ |
| $0 < X_k < 2a$ | | | $Z'_{2k} \geq 0$ | $X_k - 4a$ | $-X_k + 2a$ |
| $-2a < X_k < 0$ | $X_k < 0$ | $Z'_{1k} < 0$ | $Z'_{2k} \geq 0$ | $-X_k - 4a$ | $X_k + 2a$ |
| $-4a < X_k < -2a$ | | | $Z'_{2k} < 0$ | $-X_k - 4a$ | $X_k + 2a$ |
| $-6a < X_k < -4a$ | | $Z'_{1k} \geq 0$ | $Z'_{2k} < 0$ | $-X_k - 4a$ | $-X_k - 6a$ |
| $X_k < -6a$ | | | $Z'_{2k} \geq 0$ | $-X_k - 4a$ | $-X_k - 6a$ |

In Table 8, $Z_{1k}=|Y_k|-4a$ and $Z_{2k}=|Z_{1k}|-2a$, and in Table 9, $Z'_{1k}=|X_k|-4a$ and $Z'_{2k}=|Z'_{1k}|-2a$. In Table 8 and Table 9, even the soft decision values at the 7 boundary values, which were omitted from Table 6 and Table 7 for convenience, are taken into consideration.

In hardware realization, Table 8 and Table 9 can be simplified into Table 10 and Table 11 on condition that a sign of $X_k$, $Y_k$, $Z_{1k}$, $Z_{2k}$, $Z'_{1k}$ and $Z'_{2k}$ can be expressed by sign bits. Table 10 and Table 11 illustrate LLR values in terms of $Y_k$, $Z_{1k}$, $Z_{2k}$, and $X_k$, $Z'_{1k}$, $Z'_{2k}$, respectively.

TABLE 10

| MSB($Y_k$) | MSB($Z_{1k}$) | MSB($Z_{2k}$) | $\Lambda(s_{k,5})$ | $\Lambda(s_{k,4})$ | $\Lambda(s_{k,3})$ |
|---|---|---|---|---|---|
| 0 | 0 | 0 | $Y_k + 3Z_{1k}$ | $Z_{1k} + Z_{2k}$ | $Z_{2k}$ |
|   |   | 1 | $Y_k + 3Z_{1k} - Z_{2k}$ | $Z_{1k}$ | $Z_{2k}$ |
|   | 1 | 0 | $Y_k$ | $Z_{1k} - Z_{2k}$ | $Z_{2k}$ |
|   |   | 1 | $Y_k - Z_{2k}$ | $Z_{1k}$ | $Z_{2k}$ |
| 1 | 0 | 0 | $Y_k - 3Z_{1k}$ | $Z_{1k} + Z_{2k}$ | $Z_{2k}$ |
|   |   | 1 | $Y_k - 3Z_{1k} + Z_{2k}$ | $Z_{1k}$ | $Z_{2k}$ |
|   | 1 | 0 | $Y_k$ | $Z_{1k} - Z_{2k}$ | $Z_{2k}$ |
|   |   | 1 | $Y_k + Z_{2k}$ | $Z_{1k}$ | $Z_{2k}$ |

TABLE 11

| MSB($Y_k$) | MSB($Z'_{1k}$) | MSB($Z'_{2k}$) | $\Lambda(s_{k,2})$ | $\Lambda(s_{k,1})$ | $\Lambda(s_{k,0})$ |
|---|---|---|---|---|---|
| 0 | 0 | 0 | $X_k + 3Z'_{1k}$ | $Z'_{1k} + Z'_{2k}$ | $Z'_{2k}$ |
|   |   | 1 | $X_k + 3Z'_{1k} - Z'_{2k}$ | $Z'_{1k}$ | $Z'_{2k}$ |
|   | 1 | 0 | $X_k$ | $Z'_{1k} - Z'_{2k}$ | $Z'_{2k}$ |
|   |   | 1 | $X_k - Z'_{2k}$ | $Z'_{1k}$ | $Z'_{2k}$ |
| 1 | 0 | 0 | $X_k - 3Z'_{1k}$ | $Z'_{1k} + Z'_{2k}$ | $Z'_{2k}$ |
|   |   | 1 | $X_k - 3Z'_{1k} + Z'_{2k}$ | $Z'_{1k}$ | $Z'_{2k}$ |
|   | 1 | 0 | $X_k$ | $Z'_{1k} - Z'_{2k}$ | $Z'_{2k}$ |
|   |   | 1 | $X_k + Z'_{2k}$ | $Z'_{1k}$ | $Z'_{2k}$ |

In Table 10 and Table 11 MSB(x) denotes a most significant bit (MSB) of a given value x.

From Table 10, soft decision values $\Lambda(s_{k,5})$, $\Lambda(s_{k,4})$ and $\Lambda(s_{k,3})$ at i=5, 4 and 3 are respectively expressed as $$\Lambda(s_{k,5}) = Y_k + c(\alpha \cdot Z_{1k} + \beta \cdot Z_{2k}), \text{ where} \quad \text{Equation (9)}$$

$$\alpha = \begin{cases} 3 & \text{if } MSB(Z_{1k}) = 0 \\ 0 & \text{if } MSB(Z_{1k}) = 1 \end{cases}$$

$$\beta = \begin{cases} 0 & \text{if } MSB(Z_{2k}) = 0 \\ -1 & \text{if } MSB(Z_{2k}) = 1 \end{cases} \text{ and}$$

$$c = \begin{cases} 1 & \text{if } MSB(Y_k) = 0 \\ -1 & \text{if } MSB(Y_k) = 1 \end{cases}$$

$$\Lambda(s_{k,4}) = Z_{1k} + \gamma \cdot Z_{2k}, \text{ where} \quad \text{Equation (10)}$$

$$\gamma = \begin{cases} 0 & \text{if } MSB(Z_{2k}) = 1 \\ 1 & \text{if } MSB(Z_{2k}) = 0 \text{ and } MSB(Z_{1k}) = 0 \\ -1 & \text{if } MSB(Z_{2k}) = 0 \text{ and } MSB(Z_{1k}) = 1 \end{cases}$$

$$\Lambda(s_{k,3}) = Z_{2k} \quad \text{Equation (11)}$$

From Table 11, soft decision values $\Lambda(s_{k,2})$, $\Lambda(s_{k,1})$ and $\Lambda(s_{k,0})$ at i=2, 1 and 0 are respectively expressed as $$\Lambda(s_{k,2}) = X_k + c'(\alpha' \cdot Z'_{1k} + \beta' \cdot Z'_{2k}), \text{ where} \quad \text{Equation (12)}$$

$$\alpha' = \begin{cases} 3 & \text{if } MSB(Z'_{1k}) = 0 \\ 0 & \text{if } MSB(Z'_{1k}) = 1 \end{cases}$$

$$\beta' = \begin{cases} 0 & \text{if } MSB(Z'_{2k}) = 0 \\ -1 & \text{if } MSB(Z'_{2k}) = 1 \end{cases} \text{ and}$$

$$c' = \begin{cases} 1 & \text{if } MSB(X_k) = 0 \\ -1 & \text{if } MSB(X_k) = 1 \end{cases}$$

$$\Lambda(s_{k,1}) = Z'_{1k} + \gamma' \cdot Z'_{2k}, \text{ where} \quad \text{Equation (13)}$$

$$\gamma' = \begin{cases} 0 & \text{if } MSB(Z'_{2k}) = 1 \\ 1 & \text{if } MSB(Z'_{2k}) = 0 \text{ and } MSB(Z'_{1k}) = 0 \\ -1 & \text{if } MSB(Z'_{2k}) = 0 \text{ and } MSB(Z'_{1k}) = 1 \end{cases}$$

$$\Lambda(s_{k,0}) = Z'_{2k} \quad \text{Equation (14)}$$

Figure 2:
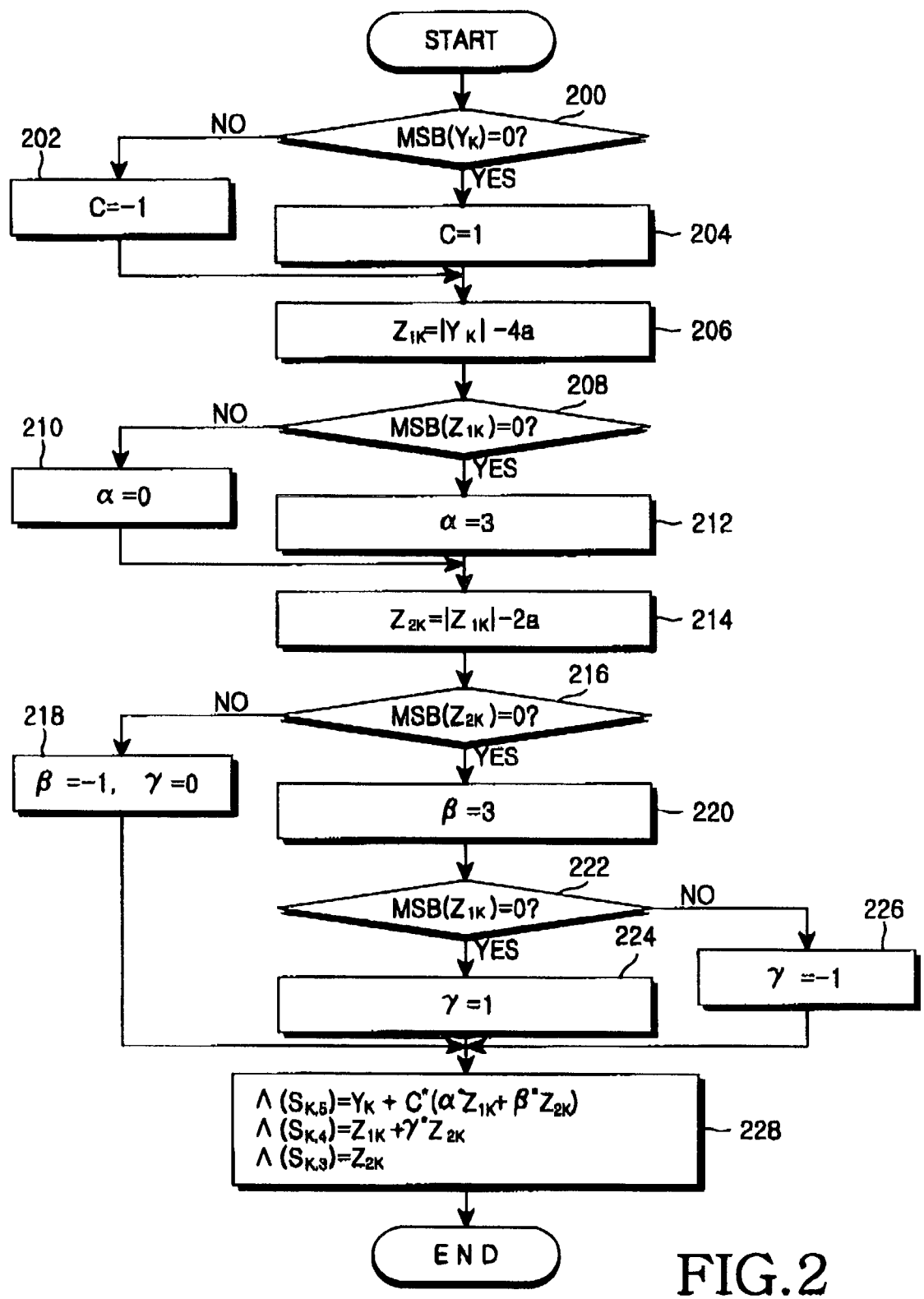
FIGS. 2 and 3 illustrate an example of processes performed for calculating soft decision values according to an embodiment of the present invention.
Figure 3:
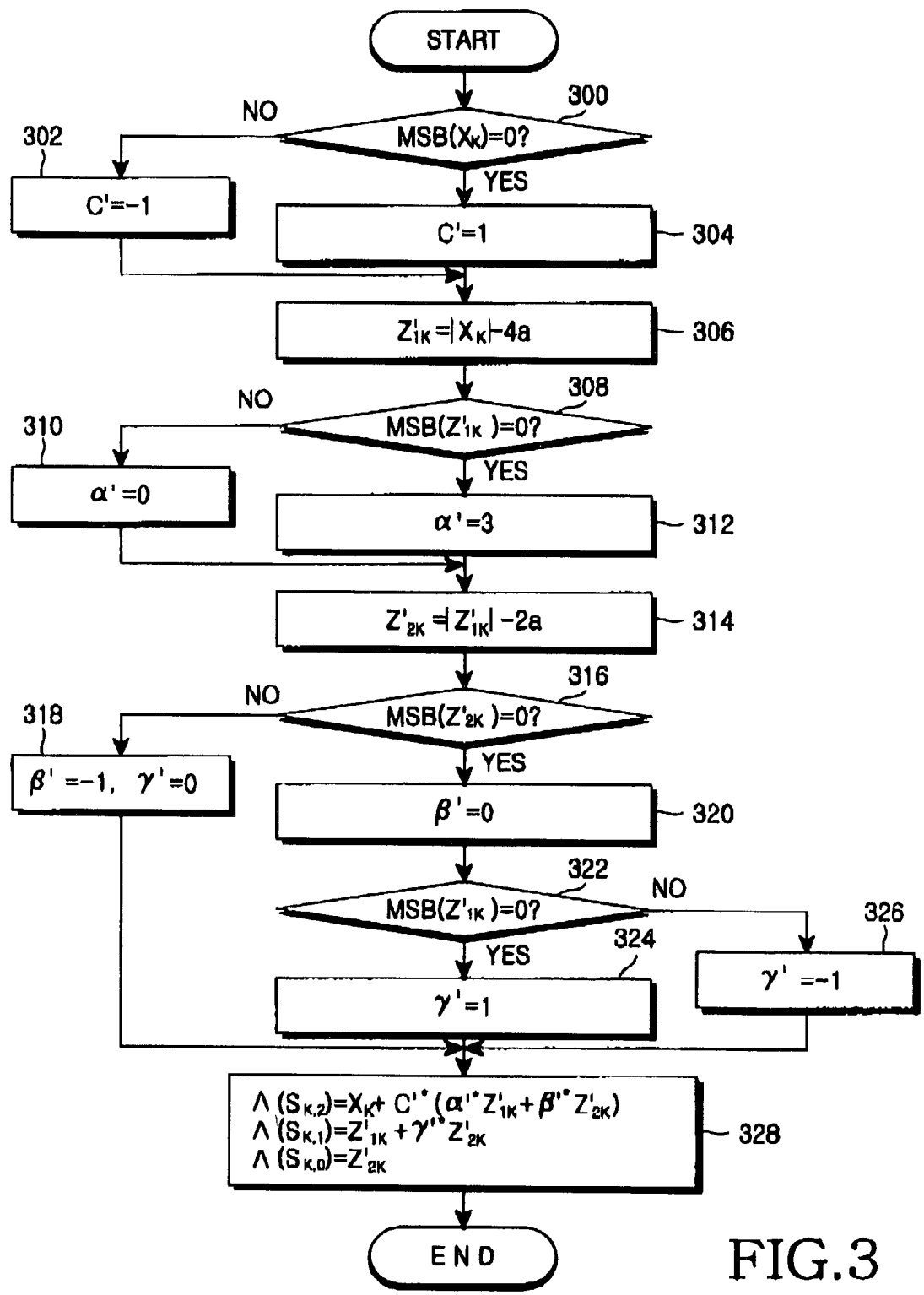

That is, in the data communication system employing 64-ary QAM, it is possible to actually calculate 6 soft decision values, which are outputs of the demodulator for one received signal and inputs of the channel decoder, using the dual minimum metric procedure of Equation (4), through the simple conditional formulas of Equation (9) to Equation (14). This process is illustrated in FIGS. 2 and 3. FIGS. 2 and 3 illustrate an example of processes performed for calculating soft decision values according to an embodiment of the present invention.

First, a process of calculating soft decision values $\Lambda(s_{k,5})$, $\Lambda(s_{k,4})$ and $\Lambda(s_{k,3})$ will be described with reference to FIG. 2. In step 200, a demodulator determines whether an MSB value of a quadrature-phase signal component $Y_k$ is 0. As a result of the determination, if an MSB value of the quadrature-phase signal component $Y_k$ is 0, the demodulator proceeds to step 204 and sets a value of a parameter c to 1. Otherwise, the demodulator proceeds to step 202 and sets a value of the parameter c to -1. After determining a value of the parameter c, the demodulator sets a value of $Z_{1k}$ to $|Y_k|-4a$ in step 206. Thereafter, the demodulator determines in step 208 whether MSB of the $Z_{1k}$ determined in step 206 is 0. As a result of the determination, if MSB of the $Z_{1k}$ is 0, the demodulator proceeds to step 212 and sets a value of a parameter $\alpha$ to 3. Otherwise, the demodulator proceeds to step 210 and sets a value of the parameter $\alpha$ to 0. After setting a value of the parameter $\alpha$, the demodulator sets a value of $Z_{2k}$ to $|Z_{1k}|-2a$ in step 214. Thereafter, the demodulator determines in step 216 whether MSB of the $Z_{2k}$ is 0. As a result of the determination, if MSB of the $Z_{2k}$ is 0, the demodulator proceeds to step 220 and sets a value of a parameter $\beta$ to 0. Otherwise, the demodulator proceeds to step 218 and sets a value of the parameter $\beta$ to -1 and a value of a parameter $\gamma$ to 0. After step 220, the demodulator determines in step 222 whether MSB of the $Z_{1k}$ is 0. As a result of the determination, if MSB of the $Z_{1k}$ is 0, the demodulator proceeds to step 224 and sets a value of the parameter $\gamma$ to 1. Otherwise, the demodulator proceeds to step 226 and sets a value of the parameter $\gamma$ to -1. Based on the determined values of the parameters $\alpha$, $\beta$, $\gamma$ and c, the demodulator calculates the soft decision values $\Lambda(s_{k,5})$, $\Lambda(s_{k,4})$ and $\Lambda(s_{k,3})$ in step 228.

Next, a process for calculating soft decision values $\Lambda(s_{k,2})$, $\Lambda(s_{k,1})$ and $\Lambda(s_{k,0})$ will be described with reference to FIG. 3. In step 300, the demodulator determines whether an MSB value of an in-phase signal component $X_k$ is 0. As a result of the determination, if an MSB value of the in-phase signal component $X_k$ is 0, the demodulator proceeds to step 304 and sets a value of a parameter c' to 1. Otherwise, the demodulator proceeds to step 302 and sets a value of the parameter c' to -1. After determining a value of the parameter c', the demodulator sets a value of $Z'_{1k}$ to $|X_k|-4a$ in step 306. Thereafter, the demodulator determines in step 308 whether MSB of the $Z'_{1k}$ determined in step 306 is 0. As a result of the determination, if MSB of the $Z'_{1k}$ is 0, the demodulator proceeds to step 312 and sets a value of a parameter $\alpha'$ to 3. Otherwise, the demodulator proceeds to step 310 and sets a value of the parameter $\alpha'$ to 0. After setting a value of the parameter $\alpha'$, the demodulator sets a value of $Z'_{2k}$ to $|Z'_{1k}|-2a$ in step 314. Thereafter, the demodulator determines in step 316 whether MSB of the $Z'_{2k}$ is 0. As a result of the determination, if MSB of the $Z'_{2k}$ is 0, the demodulator proceeds to step 320 and sets a value of a parameter $\beta'$ to 0. Otherwise, the demodulator proceeds to step 318 and sets a value of the parameter $\beta'$ to -1 and a value of a parameter $\gamma'$ to 0. After step 320, the demodulator determines in step 322 whether MSB of the $Z'_{1k}$ is 0. As a result of the determination, if MSB of the $Z'_{1k}$ is 0, the demodulator proceeds to step 324 and sets a value of the parameter $\gamma'$ to 1. Otherwise, the demodulator proceeds to step 326 and sets a value of the parameter $\gamma'$ to -1. Based on the determined values of the parameters $\alpha'$, $\beta'$, $\gamma'$ and c', the demodulator calculates the soft decision values $\Lambda(s_{k,2})$, $\Lambda(s_{k,1})$ and $\Lambda(s_{k,0})$ in step 328.

The process for calculating the soft decision values by the dual minimum metric procedure as described in conjunction with FIGS. 2 and 3 can be divided into (i) a first step of determining the parameters $\alpha$, $\beta$, $\gamma$ and c by analyzing the quadrature-phase signal component $Y_k$ and a value "a" and determining the parameters $\alpha'$, $\beta'$, $\gamma'$ and c' by analyzing the in-phase signal component $X_k$ and a value "a", and (ii) a second step of calculating soft decision values using a received signal and the parameters determined in the first step. This process can be realized by a block diagram illustrated in FIG. 4.

Figure 4:
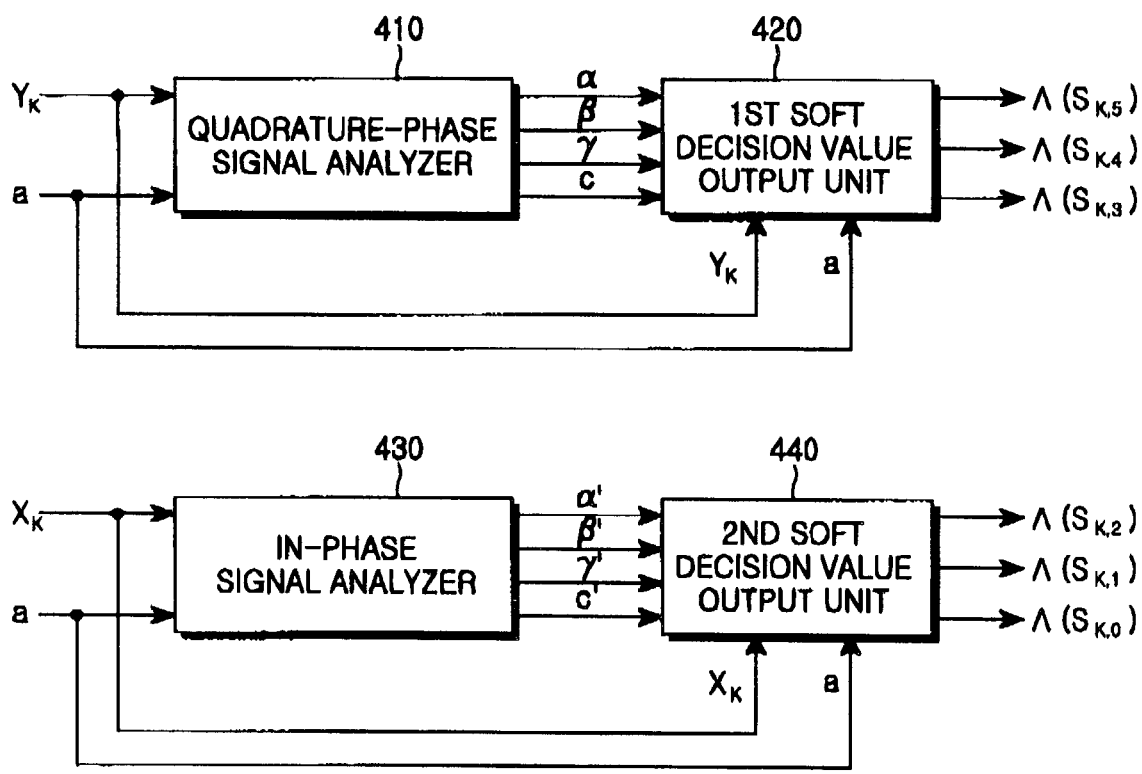
FIG. 4 illustrates a block diagram of an embodiment of the present invention for calculating soft decision values using a quadrature-phase signal component $Y_k$, an in-phase signal component $X_k$, and a distance value "a"

FIG. 4 illustrates a block diagram for calculating soft decision values using a quadrature-phase signal component $Y_k$, an in-phase signal component $X_k$, and a value "a". The processes of FIGS. 2 and 3 will be described in brief with reference to FIG. 3. A quadrature-phase signal analyzer 410 determines parameters $\alpha$, $\beta$, $\gamma$ and c using the quadrature-phase signal $Y_k$ and the value "a" through the process of FIG. 2. A first soft decision value output unit 420 calculates soft decision values $\Lambda(s_{k,5})$, $\Lambda(s_{k,4})$ and $\Lambda(s_{k,3})$ using the determined parameters $\alpha$, $\beta$, $\gamma$ and c. Similarly, an in-phase signal analyzer 430 determines parameters $\alpha'$, $\beta'$, $\gamma'$ and c' using the in-phase signal $X_k$ and the value "a" through the process of FIG. 3. A second soft decision value output unit 440 calculates soft decision values $\Lambda(s_{k,2})$, $\Lambda(s_{k,1})$ and $\Lambda(s_{k,0})$ using the determined parameters $\alpha'$, $\beta'$, $\gamma'$ and c'.

Figure 5:
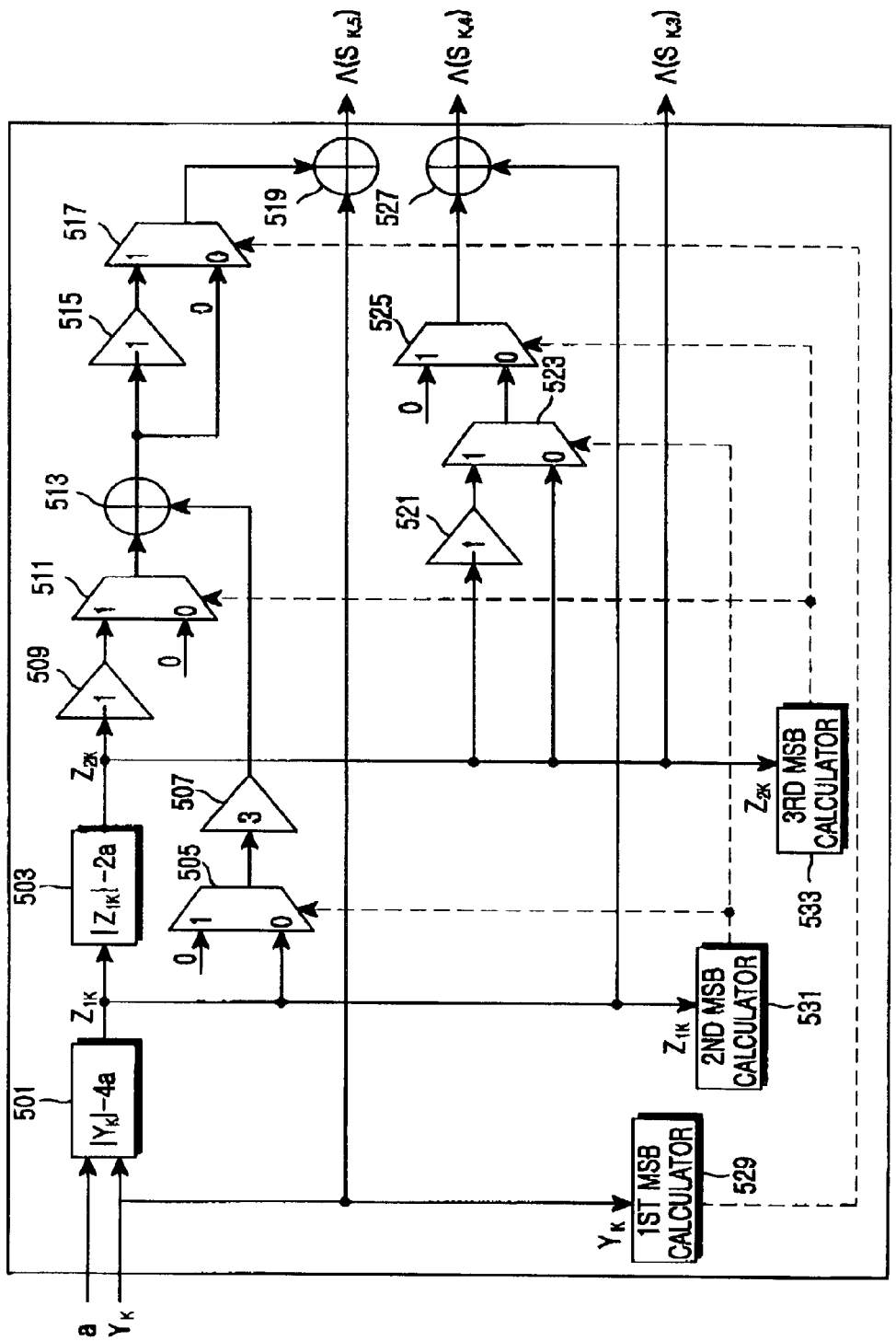
FIGS. 5 and 6 illustrate an embodiment of the present invention of calculators for calculating the soft decision values for use in a demodulator in a data communication system employing 64-ary QAM.
Figure 6:
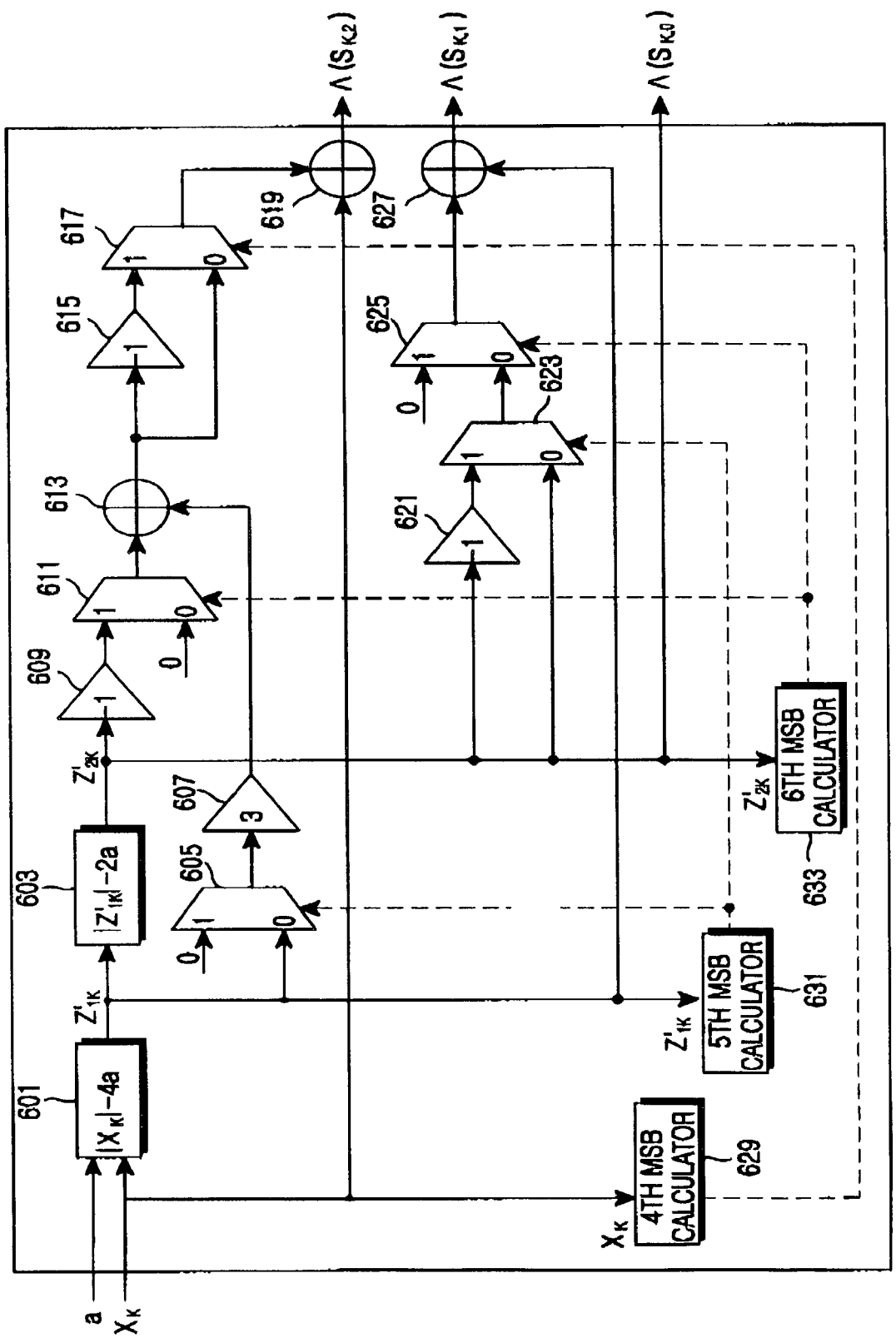

FIGS. 5 and 6 illustrate calculators for calculating soft decision values input to a channel decoder for use in a channel demodulator in a data communication system employing 64-ary QAM. FIG. 5 illustrates a calculator for calculating soft decision values $\Lambda(s_{k,5})$, $\Lambda(s_{k,4})$ and $\Lambda(s_{k,3})$, and FIG. 6 illustrates a calculator for calculating soft decision values $\Lambda(s_{k,2})$, $\Lambda(s_{k,1})$ and $\Lambda(s_{k,0})$.

First, an example of a structure and operation of an apparatus for calculating the soft decision values $\Lambda(s_{k,5})$, $\Lambda(s_{k,4})$ and $\Lambda(s_{k,3})$ will be described with reference to FIG. 5. A quadrature-phase signal $Y_k$ and a value "a" are applied to a first operator 501. Further, the quadrature-phase signal $Y_k$ is applied to a second adder 519 and a first MSB calculator 529. The first operator 501 calculates $Z_{1k}=|Y_k|-4a$ as described in step 206 of FIG. 2. The first MSB calculator 529 calculates MSB of the received quadrature-phase signal $Y_k$. The output of the first operator 501 is applied to a second operator 503, an input terminal "0" of a first multiplexer 505, a second MSB calculator 531, and a third adder 527. The second MSB calculator 531 calculates MSB of the $Z_{1k}$ and provides its output to a select terminal of the first multiplexer 505 and a select terminal of a fourth multiplexer 523. A value "0" is always applied to an input terminal "1" of the first multiplexer 505. The first multiplexer 505 selects the input terminal "0" or the input terminal "1" thereof according to a select signal from the second MSB calculator 531.

The second operator 503 calculates $Z_{2k}=|Z_{1k}|-2a$ as described in step 214 of FIG. 2, and provides the calculated value $Z_{2k}$ to a second multiplier 509, a third MSB calculator 533, a fourth multiplier 521, and an input terminal "0" of the fourth multiplexer 523. The value $Z_{2k}$ becomes a soft decision value $\Lambda(s_{k,3})$. The second multiplier 509 multiplies the output value of the second operator 503 by a value "–1," and provides its output to an input terminal "1" of a second multiplexer 511. An input terminal "0" of the second multiplexer 511 always has a value "0."

Meanwhile, the third MSB calculator 533 calculates MSB of the $Z_{2k}$, and provides its output to a select terminal of the second multiplexer 511 and a select terminal of a fifth multiplexer 525. The second multiplexer 511 selects the input terminal "0" or the input terminal "1" thereof according to a select signal from the third MSB calculator 533. The output of the second multiplexer 511 is applied to a first adder 513.

The output of the first multiplexer 505 is applied to a first multiplier 507. The first multiplier 507 triples the output value of the first multiplexer 505, and provides its output to the first adder 513. The first adder 513 adds the output of the second multiplexer 511 to the output of the first multiplier 507, and provides its output to a third multiplier 515 and an input terminal "0" of a third multiplexer 517. The third multiplier 515 multiplies the output of the first adder 513 by a value "–1," and provides its output to an input terminal "1" of the third multiplexer 517. The third multiplexer 517 selects the input terminal "0" or the input terminal "1" thereof according to a select signal provided from the first MSB calculator 529. The output of the third multiplexer 517 is applied to the second adder 519. The second adder 519 adds the quadrature-phase signal component $Y_k$ to the output of the third multiplexer 517. The output of the second adder 519 becomes the soft decision value $\Lambda(s_{k,5})$ Further, the fourth multiplier 521 multiplies the value $Z_{2k}$ by a value "–1" and provides its output to an input terminal "1" of the fourth multiplexer 523. The fourth multiplexer 523 selects the input terminal "0" or the input terminal "1" thereof according to a select signal provided from the second MSB calculator 531. The output of the fourth multiplexer 523 is applied to an input terminal "0" of the fifth multiplexer 525. A value "0" is always applied to an input terminal "1" of the fifth multiplexer 525. The fifth multiplexer 525 selects the input terminal "0" or the input terminal "1" thereof according to a select signal provided from the third MSB calculator 533. The output of the fifth multiplexer 525 is applied to the third adder 527. The third adder 527 adds the output of the fifth multiplexer 525 to the output $Z_{1k}$ of the first operator 501. The output value of the third adder 527 becomes the soft decision value $\Lambda(s_{k,4})$.

In this manner, the circuit of FIG. 5 can calculate the soft decision values $\Lambda(s_{k,5})$, $\Lambda(s_{k,4})$ and $\Lambda(s_{k,3})$ from the quadrature-phase signal component $Y_k$ and the value "a".

Next, an example of a structure and operation of an apparatus for calculating the soft decision values $\Lambda(s_{k,2})$, $\Lambda(s_{k,1})$ and $\Lambda(s_{k,0})$ will be described with reference to FIG. 6. An in-phase signal $X_k$ and a value "a" are applied to a third operator 601. Further, the in-phase signal $X_k$ is applied to a fifth adder 619 and a fourth MSB calculator 629. The third operator 601 calculates $Z'_{1k}=|X_k|-4a$ as described in step 306 of FIG. 3. The fourth MSB calculator 629 calculates MSB of the received in-phase signal $X_k$. The output of the third operator 601 is applied to a fourth operator 603, an input terminal "0" of a sixth multiplexer 605, a fifth MSB calculator 631, and a sixth adder 627. The fifth MSB calculator 631 calculates MSB of the $Z'_{1k}$ and provides its output to a select terminal of the sixth multiplexer 605 and a select terminal of a ninth multiplexer 623. A value "0" is always applied to an input terminal "1" of the sixth multiplexer 605. The sixth multiplexer 605 selects the input terminal "0" or the input terminal "1" thereof according to a select signal from the fifth MSB calculator 631.

The fourth operator 603 calculates $Z'_{2k}=|Z'_{1k}|-2a$ as described in step 314 of FIG. 3, and provides the calculated value $Z'_{2k}$ to a sixth multiplier 609, a sixth MSB calculator 633, an eighth multiplier 621, and an input terminal "0" of the ninth multiplexer 623. The value $Z'_{2k}$ becomes a soft decision value $\Lambda(s_{k,0})$. The sixth multiplier 609 multiplies the output value of the fourth operator 603 by a value "–1," and provides its output to an input terminal "1" of a seventh multiplexer 611. An input terminal "0" of the seventh multiplexer 611 always has a value "0."

Meanwhile, the sixth MSB calculator 633 calculates MSB of the $Z'_{2k}$, and provides its output to a select terminal of the seventh multiplexer 611 and a select terminal of a tenth multiplexer 625. The seventh multiplexer 611 selects the input terminal "0" or the input terminal "1" thereof according to a select signal from the sixth MSB calculator 633. The output of the seventh multiplexer 611 is applied to a fourth adder 613.

The output of the sixth multiplexer 605 is applied to a fifth multiplier 607. The fifth multiplier 607 triples the output value of the sixth multiplexer 605, and provides its output to the fourth adder 613. The fourth adder 613 adds the output of the seventh multiplexer 611 to the output of the fifth multiplier 607, and provides its output to a seventh multiplier 615 and an input terminal "0" of an eighth multiplexer 617. The seventh multiplier 615 multiplies the output of the fourth adder 613 by a value "–1," and provides its output to an input terminal "1" of the eighth multiplexer 617. The eighth multiplexer 617 selects the input terminal "0" or the input terminal "1" thereof according to a select signal provided from the fourth MSB calculator 629. The output of the eighth multiplexer 617 is applied to the fifth adder 619. The fifth adder 619 adds the in-phase signal component $X_k$ to the output of the eighth multiplexer 617. The output of the fifth adder 619 becomes the soft decision value $\Lambda(s_{k,2})$.

Further, the eighth multiplier 621 multiplies the value $Z'_{2k}$ by a value "–1" and provides its output to an input terminal "1" of the ninth multiplexer 623. The ninth multiplexer 623 selects the input terminal "0" or the input terminal "1" thereof according to a select signal provided from the fifth MSB calculator 631. The output of the ninth multiplexer 623 is applied to an input terminal "0" of the tenth multiplexer 625. A value "0" is always applied to an input terminal "1" of the tenth multiplexer 625. The tenth multiplexer 625 selects the input terminal "0" or the input terminal "1"

thereof according to a select signal provided from the sixth MSB calculator 633. The output of the tenth multiplexer 625 is applied to the sixth adder 627. The sixth adder 627 adds the output of the tenth multiplexer 625 to the output $Z'_{1k}$ of the third operator 601. The output value of the sixth adder 627 becomes the soft decision value $\Lambda(s_{k,1})$. In this manner, the circuit of FIG. 6 can calculate the soft decision values $\Lambda(s_{k,2})$, $\Lambda(s_{k,1})$ and $\Lambda(s_{k,0})$ from the in-phase signal component $X_k$ and the value "a". According to the foregoing description, a conventional soft decision value calculator using the dual minimum metric procedure realized by Equation (4) needs one hundred or more squaring operations and comparison operations. However, the calculators according to an embodiment of the present invention as exemplified in FIGS. 5 and 6 and realized using Equation (9) to Equation (14) are comprised of 10 adders (first to fourth operators are also realized by adders), 8 multipliers and 10 multiplexers, contributing to a remarkable reduction in operation time and complexity of the calculator. Table 12 below illustrates a comparison made between the conventional calculator realized by Equation (4) and the novel calculator realized by Equations (9) to (14) in terms of the type and number of operations, for $i \in \{0, 1, 2, 3, 4, 5\}$.

TABLE 12

| Equation (4) | | Equations (9) to (14) | |
|---|---|---|---|
| Operation | No of Operations | Operation | No of Operations |
| Addition | 3 × 64 + 6 = 198 | Addition | 10 |
| Squaring | 2 × 64 = 128 | Multiplication | 8 |
| Comparison | 31 × 2 × 6 = 372 | Multiplexing | 10 |

In summary, the embodiment of the present invention described above derives Table 6 to Table 11 from Equation (6) to Equation (8) and the process of Table 1 to Table 5, in order to reduce a time delay and complexity, which may occur when Equation (4), the known dual minimum metric procedure, or Equation (5) obtained by simplifying the dual minimum metric procedure is actually realized using the 64-ary QAM. Further, the embodiment of the present invention provides Equation (9) to Equation (14), new formulas used to realize the dual minimum metric procedure in the 64-ary QAM. In addition, the present invention provides a hardware device realized based on Equation (9) and Equation (14).

As described above, in deriving a soft decision value needed as an input of a channel decoder using the dual minimum metric procedure, the novel 64-ary QAM demodulator for a data communication system can perform simple and rapid calculations while obtaining the same result as when the exiting formula is used. A soft decision value calculator realized by hardware remarkably reduces an operation time and complexity of the demodulator.

While the invention has been shown and described with reference to an embodiment thereof, it will be understood by those skilled in the art that various changes in form and details may be made therein without departing from the spirit and scope of the invention as defined by the appended claims.

What is claimed is:

1. A 64-ary QAM (Quadrature Amplitude Modulation) demodulation apparatus for receiving an input signal $R_k(X_k, Y_k)$ comprised of a $k^{th}$ quadrature-phase signal $Y_k$ and a $k^{th}$ in-phase signal $X_k$, and for generating soft decision values $\Lambda(s_{k,5})$, $\Lambda(s_{k,4})$, $\Lambda(s_{k,3})$, $\Lambda(s_{k,2})$, $\Lambda(s_{k,1})$ and $\Lambda(s_{k,0})$ for the input signal $R_k(X_k, Y_k)$ by a soft decision means, comprising:

a first soft decision value generator, adapted to receive the quadrature-phase signal $Y_k$ of the received signal $R_k$ and a distance value 2a between six demodulated symbols on the same axis, and to generate soft decision values $\Lambda(s_{k,5})$, $\Lambda(s_{k,4})$ and $\Lambda(s_{k,3})$ for sixth, fifth and fourth demodulated symbols using the following equations, $$Z_{1k} = |Y_k| - 4a$$

$$Z_{2k} = |Z_{1k}| - 2a$$

$$\Lambda(s_{k,5}) = Y_k + c(\alpha \cdot Z_{1k} + \beta \cdot Z_{2k}), \text{ where}$$

$$\alpha = \begin{cases} 3 & \text{if } MSB(Z_{1k}) = 0 \\ 0 & \text{if } MSB(Z_{1k}) = 1 \end{cases}$$

$$\beta = \begin{cases} 0 & \text{if } MSB(Z_{2k}) = 0 \\ -1 & \text{if } MSB(Z_{2k}) = 1 \end{cases} \text{ and}$$

$$c = \begin{cases} 1 & \text{if } MSB(Y_k) = 0 \\ -1 & \text{if } MSB(Y_k) = 1 \end{cases}$$

$$\Lambda(s_{k,4}) = Z_{1k} + \gamma \cdot Z_{2k}, \text{ where}$$

$$\gamma = \begin{cases} 0 & \text{if } MSB(Z_{2k}) = 1 \\ 1 & \text{if } MSB(Z_{2k}) = 0 \text{ and } MSB(Z_{1k}) = 0 \\ -1 & \text{if } MSB(Z_{2k}) = 0 \text{ and } MSB(Z_{1k}) = 1 \end{cases}$$

$$\Lambda(s_{k,3}) = Z_{2k}$$

where $\Lambda(s_{k,5})$ indicates the soft decision value for the sixth modulated symbol, $\Lambda(s_{k,4})$ indicates the soft decision value for the fifth modulated symbol, and $\Lambda(s_{k,3})$ indicates the soft decision value for the fourth modulated symbol; and a second soft decision value generator, adapted to receive the in-phase signal $X_k$ of the received signal $R_k$ and the distance value 2a between the six demodulated symbols on the same axis, and generating soft decision values $\Lambda(s_{k,2})$, $\Lambda(s_{k,1})$ and $\Lambda(s_{k,0})$ for third, second and first demodulated symbols using the following equations, $$Z'_{1k} = |X_k| - 4a$$

$$Z'_{2k} = |Z'_{1k}| - 2a$$

$$\Lambda(s_{k,2}) = X_k + c'(\alpha' \cdot Z'_{1k} + \beta' \cdot Z'_{2k}), \text{ where}$$

$$\alpha' = \begin{cases} 3 & \text{if } MSB(Z'_{1k}) = 0 \\ 0 & \text{if } MSB(Z'_{1k}) = 1 \end{cases}$$

$$\beta' = \begin{cases} 0 & \text{if } MSB(Z'_{2k}) = 0 \\ -1 & \text{if } MSB(Z'_{2k}) = 1 \end{cases} \text{ and}$$

$$c' = \begin{cases} 1 & \text{if } MSB(X_k) = 0 \\ -1 & \text{if } MSB(X_k) = 1 \end{cases}$$

$$\Lambda(s_{k,1}) = Z'_{1k} + \gamma' \cdot Z'_{2k}, \text{ where}$$

$$\gamma' = \begin{cases} 0 & \text{if } MSB(Z'_{2k}) = 1 \\ 1 & \text{if } MSB(Z'_{2k}) = 0 \text{ and } MSB(Z'_{1k}) = 0 \\ -1 & \text{if } MSB(Z'_{2k}) = 0 \text{ and } MSB(Z'_{1k}) = 1 \end{cases}$$

$$\Lambda(s_{k,0}) = Z'_{2k}$$

where $\Lambda(s_{k,2})$ indicates the soft decision value for the third modulated symbol, $\Lambda(s_{k,1})$ indicates the soft decision value for the second modulated symbol, and $\Lambda(s_{k,0})$ indicates the soft decision value for the first modulated symbol and the "MSB" means the most significant bit and the "a" means a distance value on the same axis.

2. The 64-ary QAM demodulation apparatus of claim 1, wherein the first soft decision value generator comprises:
a first operator, adapted to calculate $Z_{1k}=|Y_k|-4a$ by receiving the quadrature-phase signal $Y_k$ and the distance value between the demodulated symbols on the same axis;
a second operator, adapted to calculate $Z_{2k}=|Z_{1k}|-2a$ by receiving the output value $Z_{1k}$ of the first operator, and providing the calculated value $Z_{2k}$ as the soft decision value $\Lambda(s_{k,3})$ for the fourth demodulated symbol;
a first MSB (Most Significant Bit) calculator, adapted to calculate MSB of the quadrature-phase signal $Y_k$;
a second MSB calculator, adapted to calculate MSB of the output value $Z_{1k}$ of the first operator;
a third MSB calculator, adapted to calculate MSB of the output value $Z_{2k}$ of the second operator;
a first selector, adapted to select the output value $Z_{1k}$ of the first operator or a value "0" according to an output value of the second MSB calculator;
a second selector, adapted to select an inversed value $-Z_{2k}$ of the output value $Z_{2k}$ of the second operator or a value "0" according to an output value of the third MSB calculator;
a first adder, adapted to add an output value of the second selector to a value determined by multiplying the output value of the first selector by 3;
a third selector, adapted to select an output value of the first adder or an inversed value of the output value of the first adder according to an output value of the first MSB calculator;
a second adder, adapted to add an output value of the third selector to the quadrature-phase signal $Y_k$ and generating the added signal as the soft decision value $\Lambda(s_{k,5})$ for the sixth demodulated symbol;
a fourth selector, adapted to select the output value $Z_{2k}$ of the second operator or an inversed value $-Z_{2k}$ of the output value $Z_{2k}$ according to the output value of the second MSB calculator;
a fifth selector, adapted to select an output value of the fourth selector or a value "0" according to the output value of the third MSB calculator; and
a third adder, adapted to add an output value of the fifth selector to the output value $Z_{1k}$ of the first operator and generating the added value as the soft decision value $\Lambda(s_{k,4})$ for the fifth demodulated symbol.

3. The 64-ary QAM demodulation apparatus of claim 1, wherein the second soft decision value generator comprises:
a third operator, adapted to calculate $Z'_{1k}=|X_k|-4a$ by receiving the in-phase signal $X_k$ and the distance value between the demodulated symbols on the same axis;
a fourth operator, adapted to calculate $Z'_{2k}=|Z'_{1k}|-2a$ by receiving the output value $Z'_{1k}$ of the third operator, and providing the calculated value $Z'_{2k}$ as the soft decision value $\Lambda(s_{k,0})$ for the first demodulated symbol;
a fourth MSB, adapted to calculate for calculating MSB of the in-phase signal $X_k$;
a fifth MSB, adapted to calculate for calculating MSB of the output value $Z'_{1k}$ of the third operator;
a sixth MSB, adapted to calculate for calculating MSB of the output value $Z'_{2k}$ of the fourth operator;

a sixth selector, adapted to select the output value $Z'_{1k}$ of the third operator or a value "0" according to an output value of the fifth MSB calculator;
a seven selector, adapted to select an inversed value $-Z'_{2k}$ of the output value $Z'_{2k}$ of the fourth operator or a value "0" according to an output value of the sixth MSB calculator;
a fourth adder, adapted to add an output value of the seventh selector to a value determined by multiplying the output value of the sixth selector by 3;
an eighth selector, adapted to select an output value of the fourth adder or an inversed value of the output value of the fourth adder according to an output value of the fourth MSB calculator;
a fifth adder, adapted to add an output value of the eighth selector to the in-phase signal $X_k$ and generating the added signal as the soft decision value $\Lambda(s_{k,2})$ for the third demodulated symbol;
a ninth selector, adapted to select the output value $Z'_{2k}$ of the fourth operator or an inversed value $-Z'_{2k}$ of the output value $Z'_{2k}$ according to the output value of the fifth MSB calculator;
a tenth selector, adapted to select an output value of the ninth selector or a value "0" according to the output value of the sixth MSB calculator; and
a sixth adder, adapted to add an output value of the tenth selector to the output value $Z'_{1k}$ of the third operator and generating the added value as the soft decision value $\Lambda(s_{k,1})$ for the second demodulated symbol.

4. A 64-ary QAM (Quadrature Amplitude Modulation) demodulation method for receiving an input signal $R_k(X_k, Y_k)$ comprised of a $k^{th}$ quadrature-phase signal $Y_k$ and a $k^{th}$ in-phase signal $X_k$, and for generating soft decision values $\Lambda(s_{k,5})$, $\Lambda(s_{k,4})$, $\Lambda(s_{k,3})$, $\Lambda(s_{k,2})$, $\Lambda(s_{k,1})$ and $\Lambda(s_{k,0})$ for the input signal $R_k(X_k, Y_k)$ by a soft decision means, the method comprising the steps of:
(a) receiving the quadrature-phase signal $Y_k$ of the received signal $R_k$ and a distance value 2a between six demodulated symbols on the same axis, and generating soft decision values $\Lambda(s_{k,5})$, $\Lambda(s_{k,4})$ and $\Lambda(s_{k,3})$ for sixth, fifth and fourth demodulated symbols using the following equations, $$Z_{1k}=|Y_k|-4a$$

$$Z_{2k}=|Z_{1k}|-2a$$

$$\Lambda(s_{k,5}) = Y_k + c(\alpha \cdot Z_{1k} + \beta \cdot Z_{2k}), \text{ where}$$

$$\alpha = \begin{cases} 3 & \text{if } MSB(Z_{1k}) = 0 \\ 0 & \text{if } MSB(Z_{1k}) = 1 \end{cases}$$

$$\beta = \begin{cases} 0 & \text{if } MSB(Z_{2k}) = 0 \\ -1 & \text{if } MSB(Z_{2k}) = 1 \end{cases} \text{ and}$$

$$c = \begin{cases} 1 & \text{if } MSB(Y_k) = 0 \\ -1 & \text{if } MSB(Y_k) = 1 \end{cases}$$

$$\Lambda(s_{k,4}) = Z_{1k} + \gamma \cdot Z_{2k}, \text{ where}$$

$$\gamma = \begin{cases} 0 & \text{if } MSB(Z_{2k}) = 1 \\ 1 & \text{if } MSB(Z_{2k}) = 0 \text{ and } MSB(Z_{1k}) = 0 \\ -1 & \text{if } MSB(Z_{2k}) = 0 \text{ and } MSB(Z_{1k}) = 1 \end{cases}$$

$$\Lambda(s_{k,3})=Z_{2k}$$

where $\Lambda(s_{k,5})$ indicates the soft decision value for the sixth modulated symbol, $\Lambda(s_{k,4})$ indicates the soft decision value for the fifth modulated symbol, and $\Lambda(s_{k,3})$ indicates the soft decision value for the fourth modulated symbol; and (b) receiving the in-phase signal $X_k$ of the received signal $R_k$ and the distance value 2a between the six demodulated symbols on the same axis, and generating soft decision values $\Lambda(s_{k,2})$, $\Lambda(s_{k,1})$ and $\Lambda(s_{k,0})$ for third, second and first demodulated symbols using the following equations, $$Z'_{1k} = |X_k| - 4a$$

$$Z'_{2k} = |Z'_{1k}| - 2a$$

$$\Lambda(s_{k,2}) = X_k + c'(\alpha' \cdot Z'_{1k} + \beta' \cdot Z'_{2k}), \text{ where}$$

$$\alpha' = \begin{cases} 3 & \text{if } MSB(Z'_{1k}) = 0 \\ 0 & \text{if } MSB(Z'_{1k}) = 1 \end{cases}$$

$$\beta' = \begin{cases} 0 & \text{if } MSB(Z'_{2k}) = 0 \\ -1 & \text{if } MSB(Z'_{2k}) = 1 \end{cases} \text{ and}$$

$$c' = \begin{cases} 1 & \text{if } MSB(X_k) = 0 \\ -1 & \text{if } MSB(X_k) = 1 \end{cases}$$

$$\Lambda(s_{k,1}) = Z'_{1k} + \gamma' \cdot Z'_{2k}, \text{ where}$$

$$\gamma' = \begin{cases} 0 & \text{if } MSB(Z'_{2k}) = 1 \\ 1 & \text{if } MSB(Z'_{2k}) = 0 \text{ and } MSB(Z'_{1k}) = 0 \\ -1 & \text{if } MSB(Z'_{2k}) = 0 \text{ and } MSB(Z'_{1k}) = 1 \end{cases}$$

$$\Lambda(s_{k,0}) = Z'_{2k}$$

where $\Lambda(s_{k,2})$ indicates the soft decision value for the third modulated symbol, $\Lambda(s_{k,1})$ indicates the soft decision value for the second modulated symbol, and $\Lambda(s_{k,0})$ indicates the soft decision value for the first modulated symbol and the "MSB" means the most significant bit and the "a" means a distance value on the same axis.

5. The 64-ary QAM demodulation method of claim 4, wherein step (a) comprises the steps of:

setting a parameter c to "1" if MSB (Most Significant Bit) of the quadrature-phase signal $Y_k$ is 0, and setting the parameter c to "−1" if MSB of the quadrature-phase signal $Y_k$ is 1;

calculating $Z_{1k} = |Y_k| - 4a$ using the quadrature-phase signal $Y_k$ and the distance value between the demodulated symbols on the same axis;

setting a parameter α to "3" if MSB of the calculated value $Z_{1k}$ is 0, and setting the parameter α to "0" if MSB of the calculated value $Z_{1k}$ is 1;

calculating $Z_{2k} = |Z_{1k}| - 2a$ using the value $Z_{1k}$ and the distance value between the demodulated symbols on the same axis;

setting a parameter β to "0" if MSB of the calculated value $Z_{2k}$ is 0, and setting the parameter β to "−1" if MSB of the calculated value $Z_{2k}$ is 1;

setting a parameter γ to "0" if MSB of the calculated value $Z_{2k}$ is 1, setting the parameter γ to "1" if MSB of the calculated value $Z_{2k}$ is 0 and MSB of the calculated value $Z_{1k}$ is 0, and setting the parameter γ to "−1" if MSB of the calculated value $Z_{2k}$ is 0 and MSB of the calculated value $Z_{1k}$ is 1; and calculating the soft decision values $\Lambda(s_{k,5})$, $\Lambda(s_{k,4})$ and $\Lambda(s_{k,3})$ based on the set values of the parameters c, α, β and γ.

6. The 64-ary QAM demodulation method of claim 4, wherein step (b) comprises the steps of:

setting a parameter c' to "1" if MSB of the in-phase signal $X_k$ is 0, and setting the parameter c' to "−1" if MSB of the in-phase signal $X_k$ is 1;

calculating $Z'_{1k} = |X_k| - 4a$ using the in-phase signal $X_k$ and the distance value between the demodulated symbols on the same axis;

setting a parameter α' to "3" if MSB of the calculated value $Z'_{1k}$ is 0, and setting the parameter α' to "0" if MSB of the calculated value $Z'_{1k}$ is 1;

calculating $Z'_{2k} = |Z'_{1k}| - 2a$ using the value $Z'_{1k}$ and the distance value between the demodulated symbols on the same axis;

setting a parameter β' to "0" if MSB of the calculated value $Z'_{2k}$ is 0, and setting the parameter β' to "−1" if MSB of the calculated value $Z'_{2k}$ is 1;

setting a parameter γ' to "0" if MSB of the calculated value $Z'_{2k}$ is 1, setting the parameter γ' to "1" if MSB of the calculated value $Z'_{2k}$ is 0 and MSB of the calculated value $Z'_{1k}$ is 0, and setting the parameter γ' to "−1" if MSB of the calculated value $Z'_{2k}$ is 0 and MSB of the calculated value $Z'_{1k}$ is 1; and calculating the soft decision values $\Lambda(s_{k,2})$, $\Lambda(s_{k,1})$ and $\Lambda(s_{k,0})$ based on the set values of the parameters c', α', β' and γ'.

* * * * *